United States Patent
Baggot et al.

(10) Patent No.: US 12,489,860 B2
(45) Date of Patent: Dec. 2, 2025

(54) DIGITAL PANNING SYSTEM AND METHOD FOR A WORK MACHINE

(71) Applicant: Deere & Company, Moline, IL (US)

(72) Inventors: Joseph J. Baggot, Dubuque, IA (US); Alek D. Jerauld, Dubuque, IA (US)

(73) Assignee: Deere & Company, Moline, IL (US)

( * ) Notice: Subject to any disclaimer, the term of this patent is extended or adjusted under 35 U.S.C. 154(b) by 166 days.

(21) Appl. No.: 18/180,282

(22) Filed: Mar. 8, 2023

(65) Prior Publication Data

US 2024/0305740 A1    Sep. 12, 2024

(51) Int. Cl.
*H04N 5/262* (2006.01)
*H04N 23/69* (2023.01)
*H04N 23/90* (2023.01)

(52) U.S. Cl.
CPC ........... *H04N 5/2628* (2013.01); *H04N 23/69* (2023.01); *H04N 23/90* (2023.01)

(58) Field of Classification Search
None
See application file for complete search history.

(56) References Cited

U.S. PATENT DOCUMENTS

| | | |
|---|---|---|
| 8,817,238 B2 | 8/2014 | Montgomery |
| 9,332,229 B2 | 5/2016 | Ishimoto |
| 10,099,365 B2 | 10/2018 | Fujita et al. |
| 10,793,166 B1 | 10/2020 | Schonert et al. |
| 11,193,255 B2 | 12/2021 | Holl et al. |
| 2014/0200759 A1* | 7/2014 | Lu .............................. G06T 7/73 701/28 |
| 2015/0158176 A1 | 6/2015 | Fujita et al. |
| 2016/0105609 A1* | 4/2016 | Pettegrew ................ H04N 5/33 348/37 |
| 2018/0170369 A1* | 6/2018 | Mitchell .................. B62D 1/02 |
| 2018/0307009 A1* | 10/2018 | Lang ..................... G02B 13/06 |
| 2019/0078292 A1 | 3/2019 | Ono |
| 2020/0032487 A1 | 1/2020 | Zieser et al. |
| 2020/0378085 A1 | 12/2020 | Ono |
| 2021/0032850 A1 | 2/2021 | Holl et al. |
| 2021/0062472 A1 | 3/2021 | Daimon et al. |
| 2021/0071394 A1 | 3/2021 | Kean et al. |
| 2021/0109197 A1* | 4/2021 | O'Keeffe ............. G01S 7/4816 |
| 2022/0025608 A1 | 1/2022 | Itoh et al. |

(Continued)

FOREIGN PATENT DOCUMENTS

| | | |
|---|---|---|
| EP | 3293971 B1 | 6/2022 |
| WO | WO21046379 A1 | 3/2021 |

*Primary Examiner* — Mohammad J Rahman

(57) ABSTRACT

A digital panning system for a work machine with an articulating joint assembly includes the fore portion of the work machine, the rear portion of the work machine, a first image capturing device, a second image capturing device, a first display device, a second display device, and a controller. The controller has a processor with a digital mapping and filtering analyzer coupled to the devices wherein the processor is configured to receive a first and second set of display pixels; selectively digitally map and filter a first and second target region from the first and second set of display pixels to display on a first and second viewing frame. The first target region and second target region are selected in response to a received joint signal. The joint signal is indicative of the articulation angle of the fore portion relative to the rear portion at the joint assembly.

19 Claims, 9 Drawing Sheets

(56) References Cited

U.S. PATENT DOCUMENTS

| | | | |
|---|---|---|---|
| 2023/0090281 A1* | 3/2023 | Kurtz | G02B 13/0095 |
| | | | 359/725 |
| 2023/0150518 A1* | 5/2023 | Zhao | G01S 17/42 |
| | | | 701/1 |
| 2024/0141622 A1* | 5/2024 | Danguchi | E02F 9/24 |
| 2025/0039551 A1* | 1/2025 | Lowe | H04N 23/20 |

* cited by examiner

DIGITAL PANNING SYSTEM AND METHOD FOR A WORK MACHINE

TECHNICAL FIELD

The disclosure relates to a work machine and method of controlling a display on a work machine with articulation.

BACKGROUND

Articulated work machines, such as articulated dump trucks (ADT's), are known in the art. For example, ADTs typically include a cab portion having a first frame supporting an operator cab, and a trailer portion for having a second frame supporting a bin. The bin is configured to contain a load and is typically coupled to an actuator for angular movement relative to the second frame. The first frame and the second frame may be operably coupled through an articulation joint. The range of view of a work machine with articulation of the rear frame can limit an operator's ease of view during turning. With rear-facing mirrors affixed to the work machine being the industry standard, therein lies an opportunity for an improved operator's clarity of the work machine's surroundings.

SUMMARY

A digital panning system and method for a work machine is disclosed. The digital panning system comprises of a fore portion, a rear portion coupled, a first image capturing device, a second image capturing device, a first display device, a second display device, and a controller. The first image capturing device is coupled to a left side of the fore portion wherein the first image capturing device generates a first image with a first set of display pixels. A second image capturing device is coupled to a right side of the fore portion wherein the second image capturing device generates a second image with a second set of display pixels. The first display device displays at least a portion of the first set of display pixels. The second display device displays at least a second portion of the second set of display pixels. The controller includes a processor with a digital mapping and filtering analyzer communicatively coupled to the first image capturing device and the first display device, and additionally communicatively coupled to the second image capturing device. The processor is configured to receive the first set of display pixels, the second set of display pixels, selectively digitally map and filter a first target region from the first set of display pixels to display the first target pixels on a first viewing frame within the first display device. The processor is further configured to selectively and digitally map and filter the second target region from the second set of display pixels to display a second target pixels on a second viewing frame within the second display device. The first target region and the second target region are selected in response to a received joint signal wherein the joint signal is indicative of the angle of the fore portion relative to the rear portion at the joint assembly.

The joint assembly enables a pivoting of the rear portion about a vertical axis.

The first target region follows a first reference point located on the rear portion of the work machine, and the second target region follows a second reference point located on the rear portion of the work machine.

The joint signal is based on one of an axle angle, a steering system feedback, a sensor at the joint assembly, and a tracking of a reference point from one of the first set of display pixels and the second set of display pixels.

The panning range of one of the first viewing frame and the second viewing frame is calibrated by establishing a first pixel setpoint when the joint articulation is near a minimum, establishing a second pixel setpoint when the joint articulation is near maximum, and deriving a pixel per unit of articulation from the first pixel setpoint and the second pixel setpoint.

The user may select the first target pixels within the first viewing frame to zoom in on the first image.

The first viewing frame and the second viewing frame are rectangular.

The first target pixels are outlined within a third viewing frame that includes all of the first set of display pixels.

The first display device is located adjacent to a rear-facing mirror coupled to the left side of the fore portion.

The method of panning a first image of a left side of a work machine and a second image of a right side of a work machine with articulation includes the following. First, the method includes generating the first image with a first set of display pixels by a first image capturing device coupled to a left side of a fore portion of the work machine. This occurs while generating the second image with a second set of display pixels by a second image capturing device coupled to a right side of a fore portion of the work machine. Subsequently, a processor on the controller of the work machine receives the first set of display pixels and the second set of display pixels and receives a joint signal indicative of an angle of a fore portion of the work machine relative to a rear portion of the work machine at a joint assembly. Then, the method includes selectively digitally mapping and filtering a first target region to create the first target pixels from the first set of display pixels in response to the joint signal. The method also includes selectively digitally mapping and filtering a second target region to create a second target pixels from the second set of display pixels in response to the joint signal. In a next step, the method includes displaying the first target pixels on a first viewing frame within the first display device and displaying the second target pixels on a second viewing frame within the second display device.

The method may further include calibrating a panning range of the first viewing frame. Calibrating a panning range includes identifying a first pixel setpoint from the first set of display pixels when the joint articulation is near a minimum; identifying a second pixel setpoint from the first set of display pixels when the joint articulation is near maximum; and deriving a pixel per unit of articulation from the first pixel setpoint and the second pixel setpoint. The calibration may occur when the work machine is in a parked position. The method may further include manually selecting the first target pixels within the first viewing frame by a user, and displaying the manually selected target pixels to display a zoomed image portion on the first viewing frame.

The above features and advantages and other features and advantages of the present teachings are readily apparent from the following detailed description of the best modes for carrying out the teachings when taken in connection with the accompanying drawings.

FIB. 4b is an exemplary embodiment of a default view of a display system without panning.

Figures 4A, 4B, 4C:
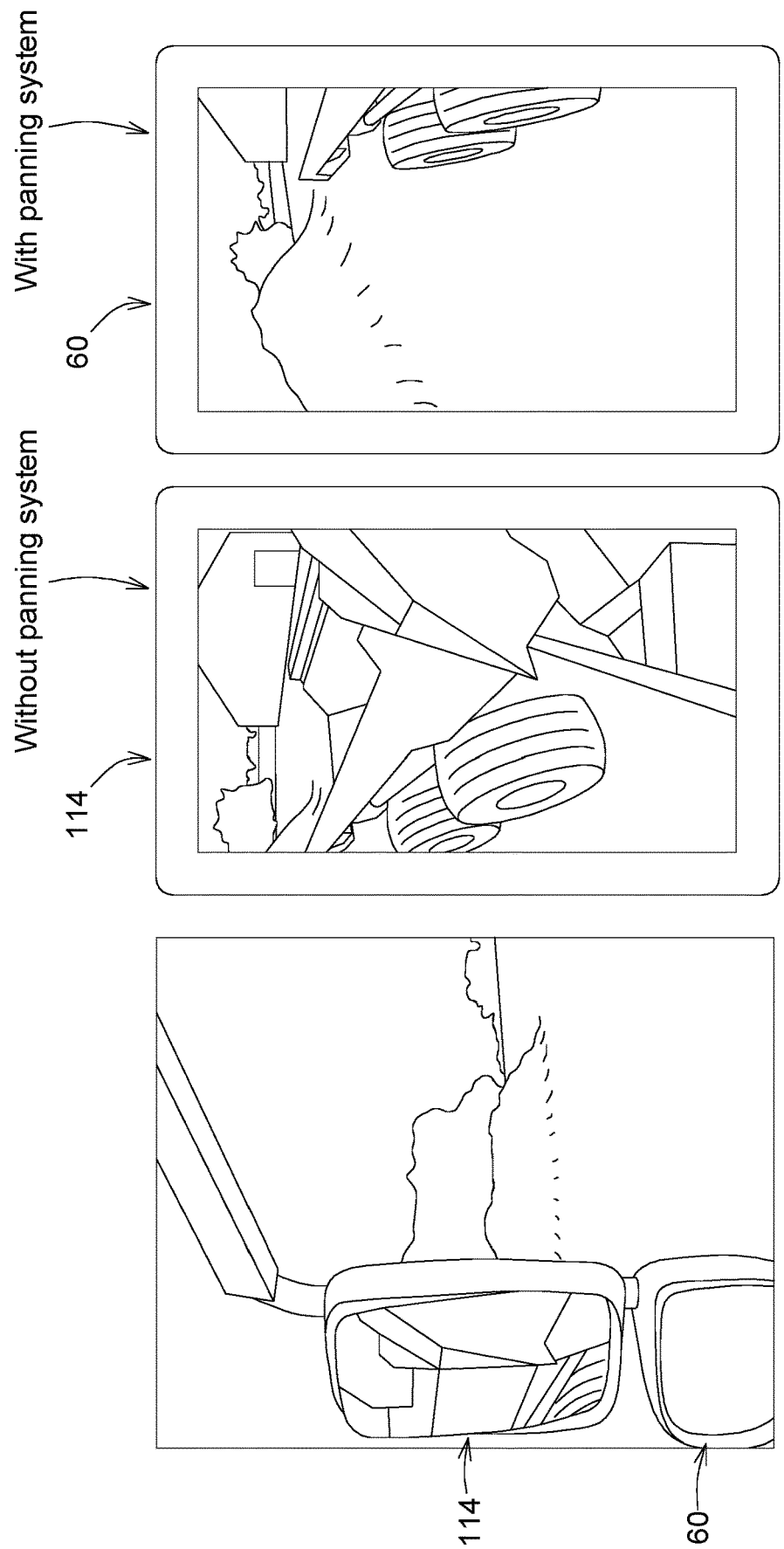
FIG. 4a is an exemplary embodiment of the display with the disclosed display system with panning.

FIG. 4c is an exemplary embodiment of a default view from a standard rearview mirror.

Figure 5:
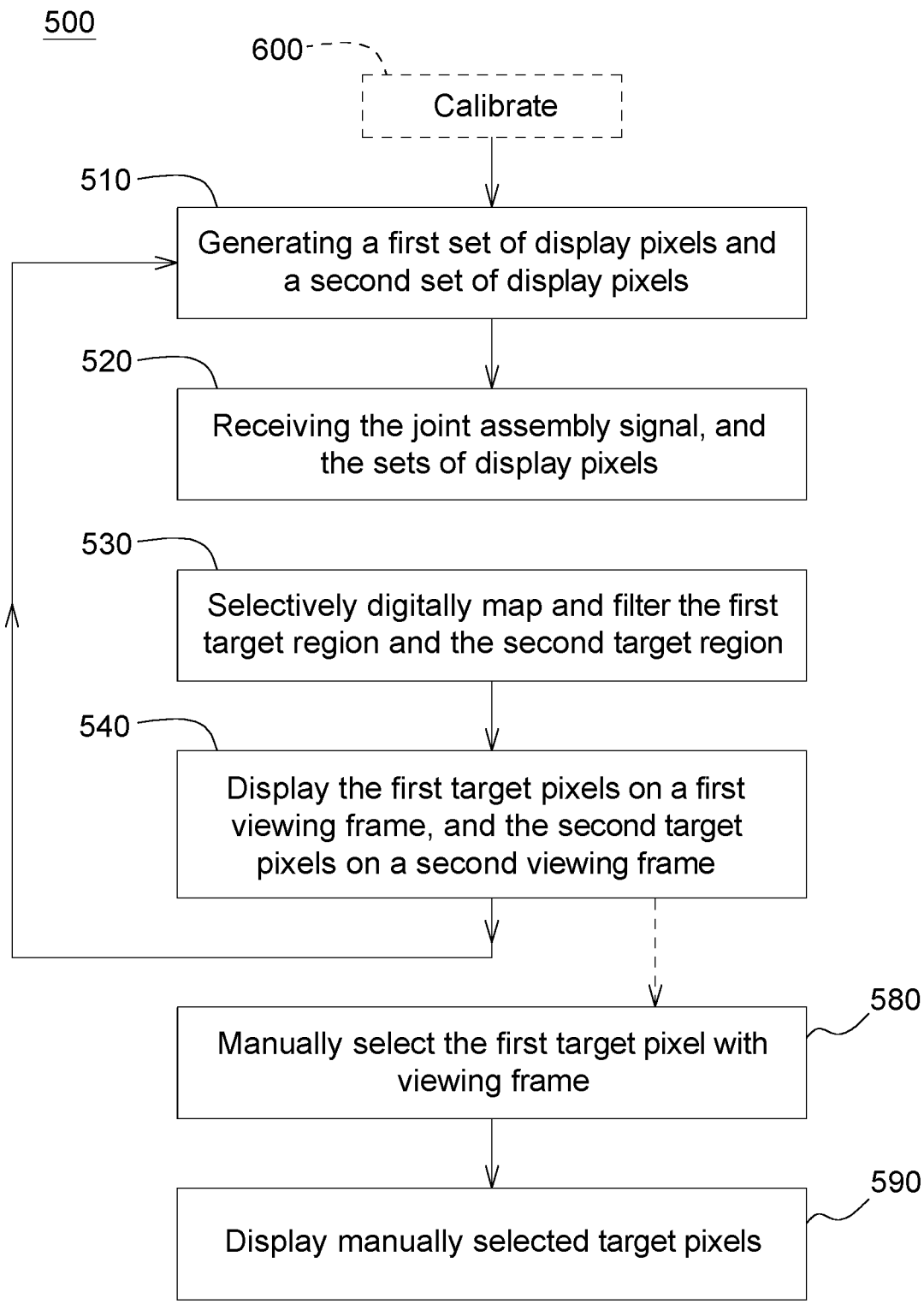

FIG. 5 is a flowchart of a method of controlling a display for a work machine having a grade control.

Figure 6:
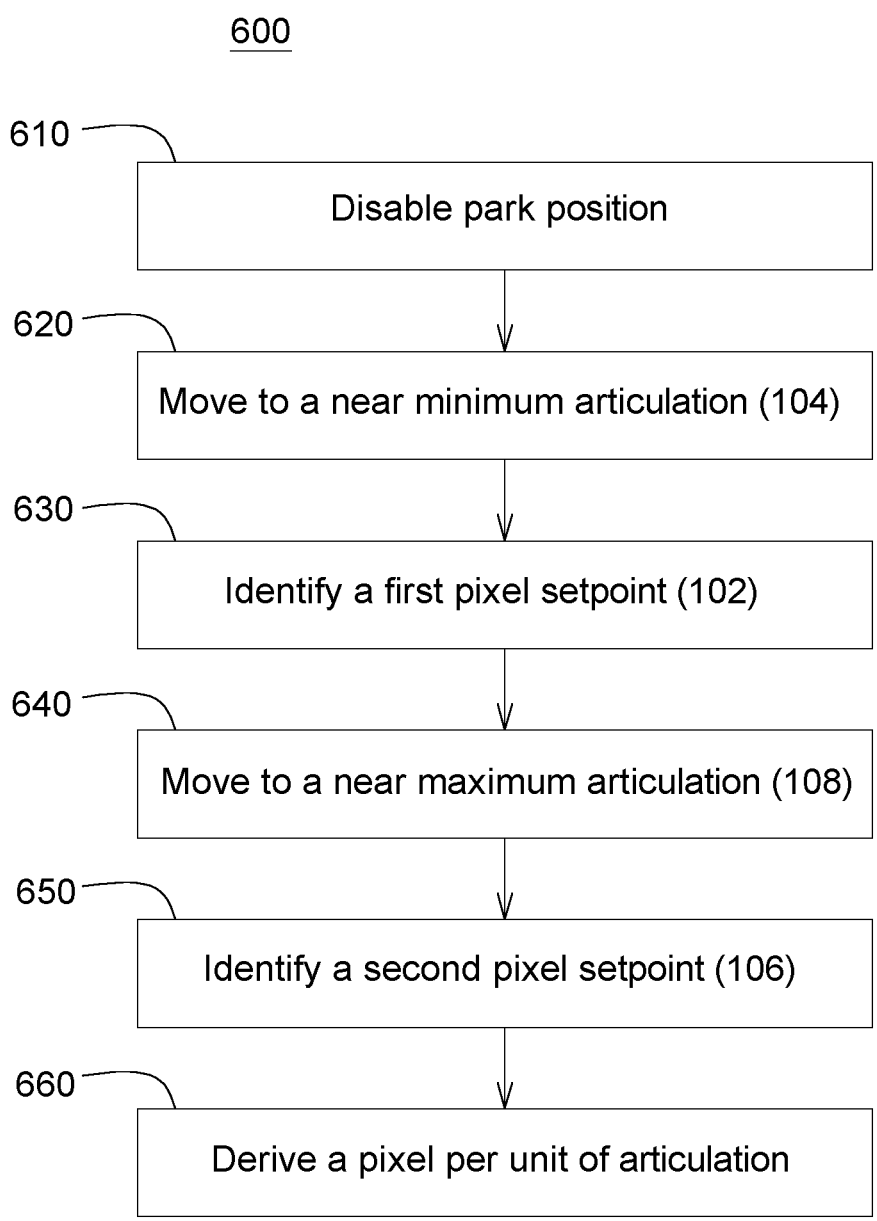

FIG. 6 is a flowchart of a method of calibrating the display system.

Figure 7A:
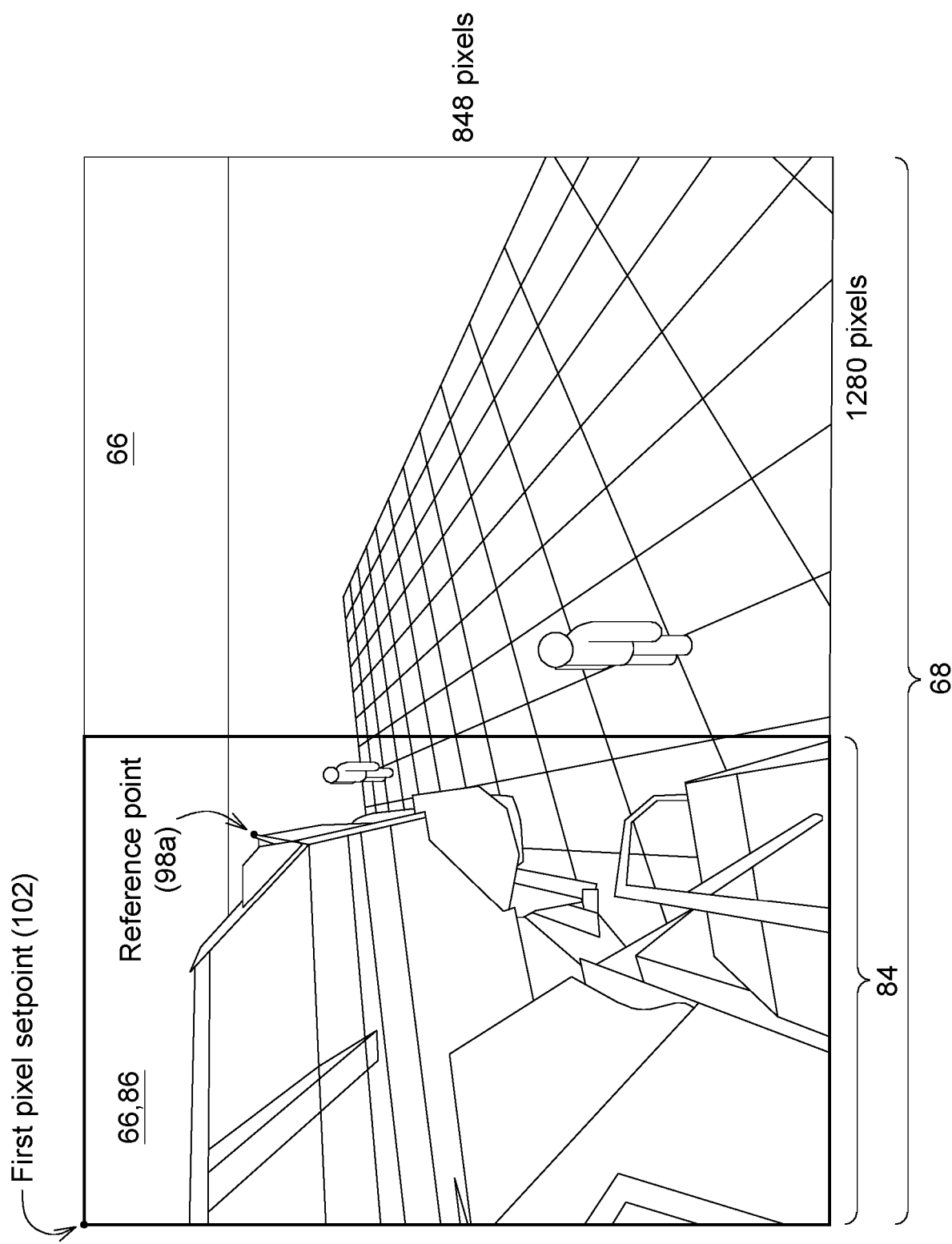

FIG. 7a is an exemplary embodiment of the display during calibration at a first setpoint.

Figure 7B:
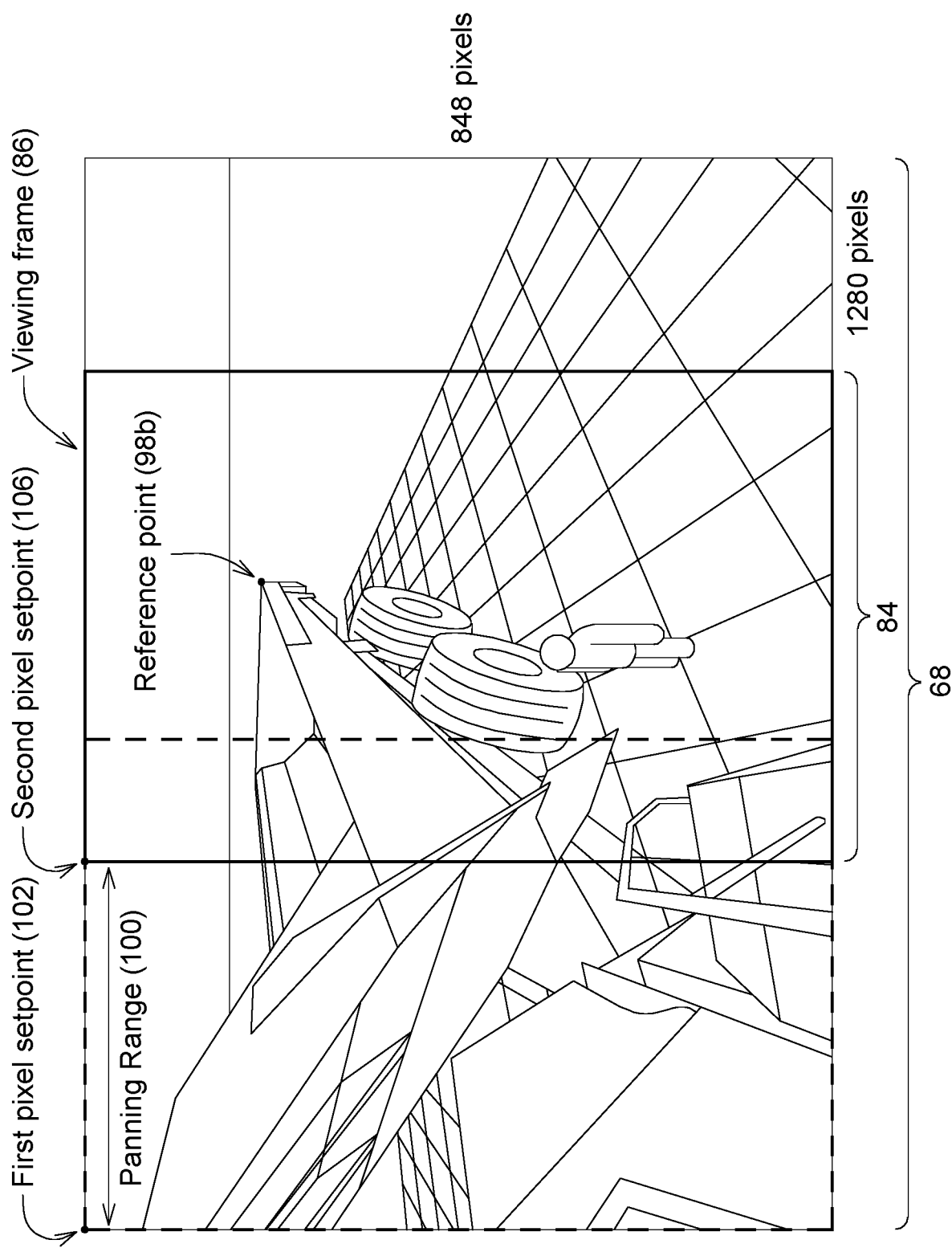

FIG. 7b is an exemplary embodiment of the display during calibration at a second setpoint.

Figure 8:
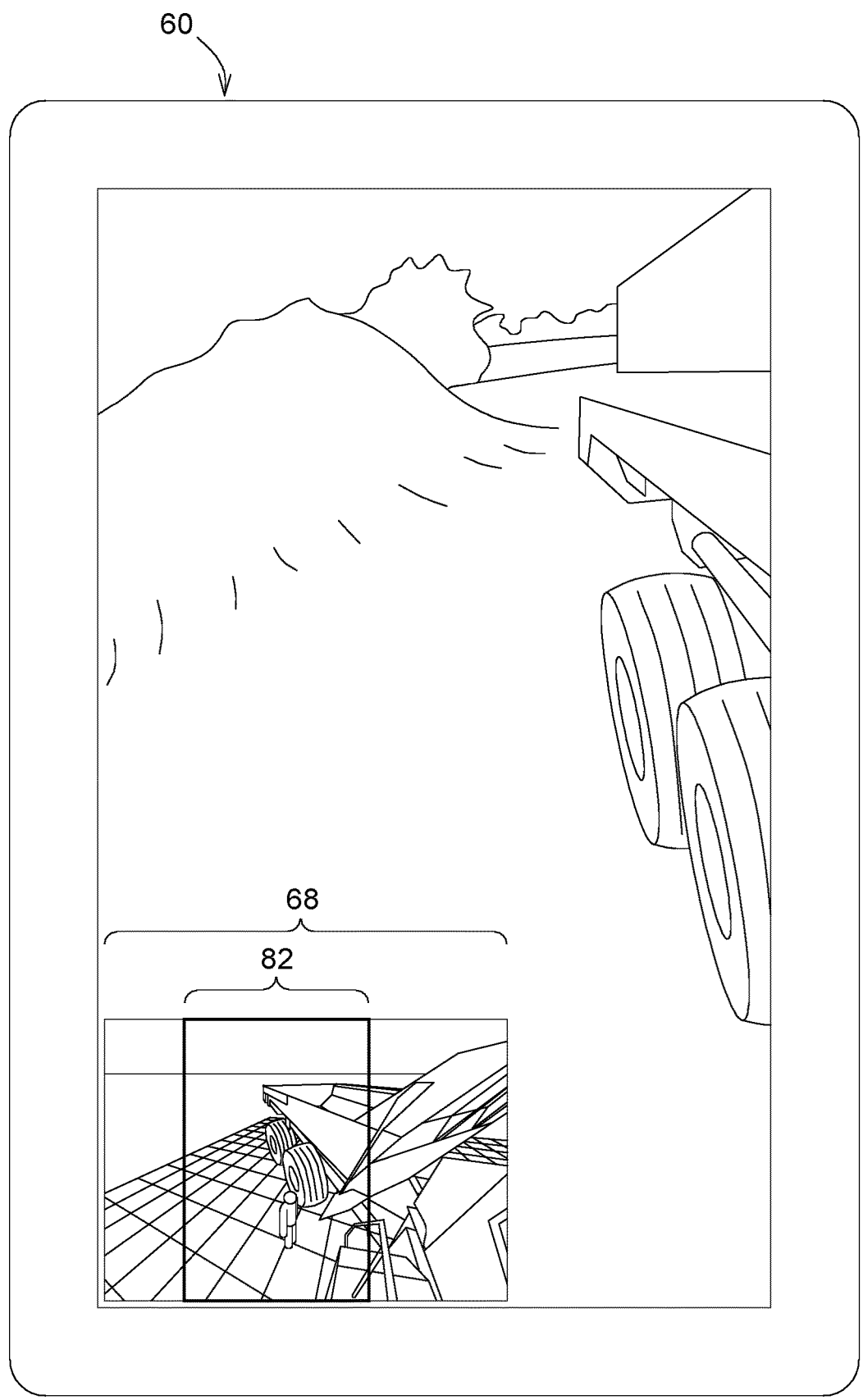

FIG. 8 is an exemplary embodiment of the first set of display pixels outlined within a third viewing frame that includes identification of the first target pixels.

DETAILED DESCRIPTION

Those having ordinary skill in the art will recognize that the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, "controller" 64 is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 64 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 64 may be in communication with other components on the work machine 100, such as hydraulic components, electrical components, and operator inputs within an operator station of an associated work machine. The controller 64 may be electrically connected to these other components by a wiring harness such that messages, commands, and electrical power may be transmitted between the controller 64 and the other components. Although the controller 64 is referenced in the singular, in alternative embodiments the configuration and functionality described herein can be split across multiple devices using techniques known to a person of ordinary skill in the art. The controller 64 includes the tangible, non-transitory memory 67 on which are recorded computer-executable program instructions, including a control algorithm. The processor 80 of the controller 64 is configured for executing the control program instructions 65.

The controller 64 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

As such, a method 500 may be embodied as a program instruction 65 operable on the controller 64. It should be appreciated that the controller 64 may include any device capable of analyzing data from various sensors, comparing data, making decisions, and executing the required tasks.

Figure 1:
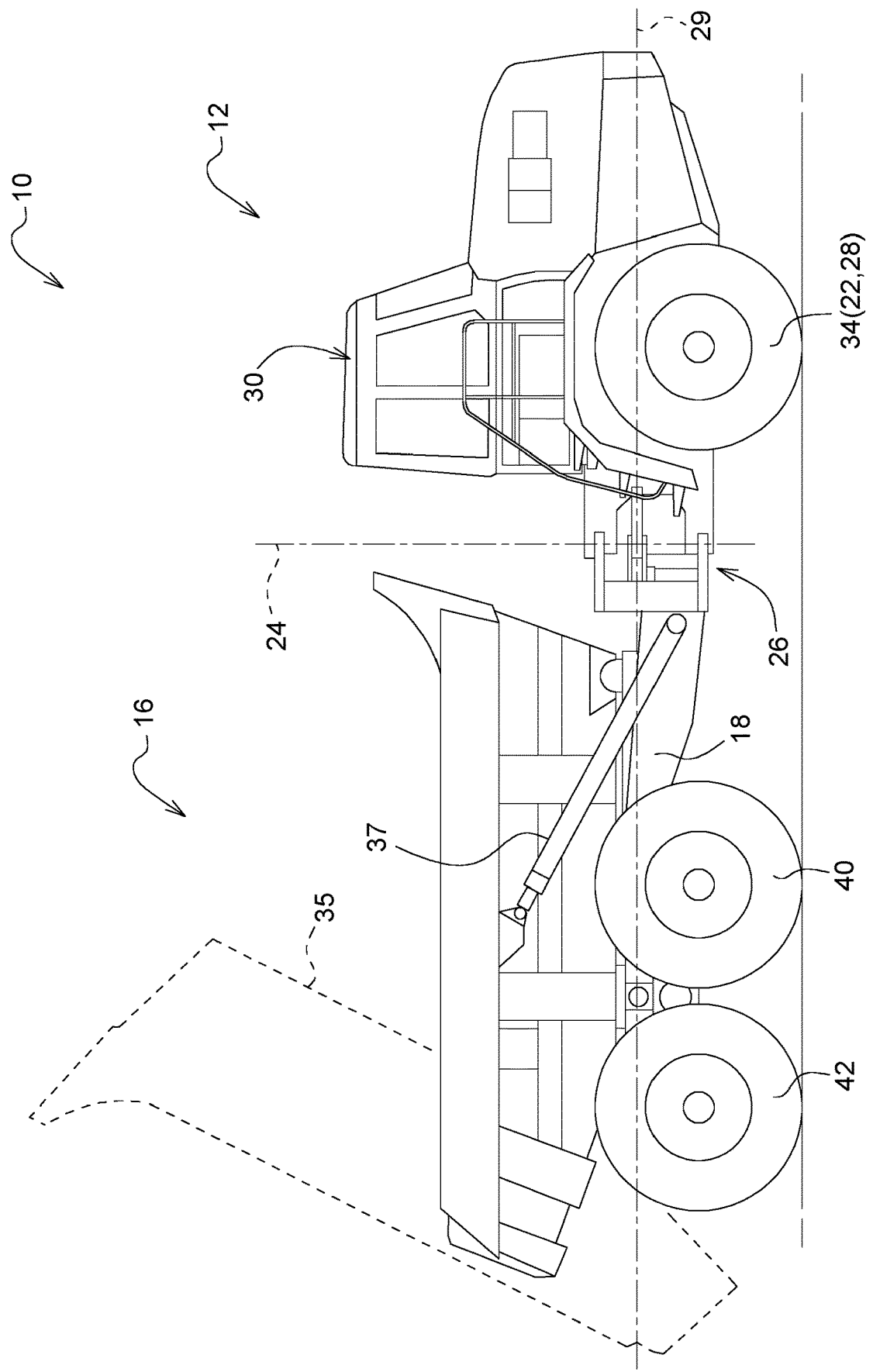
FIG. 1 is a side view of one embodiment of a work machine with an articulating joint, shown as an articulated dump truck.
Figure 2:
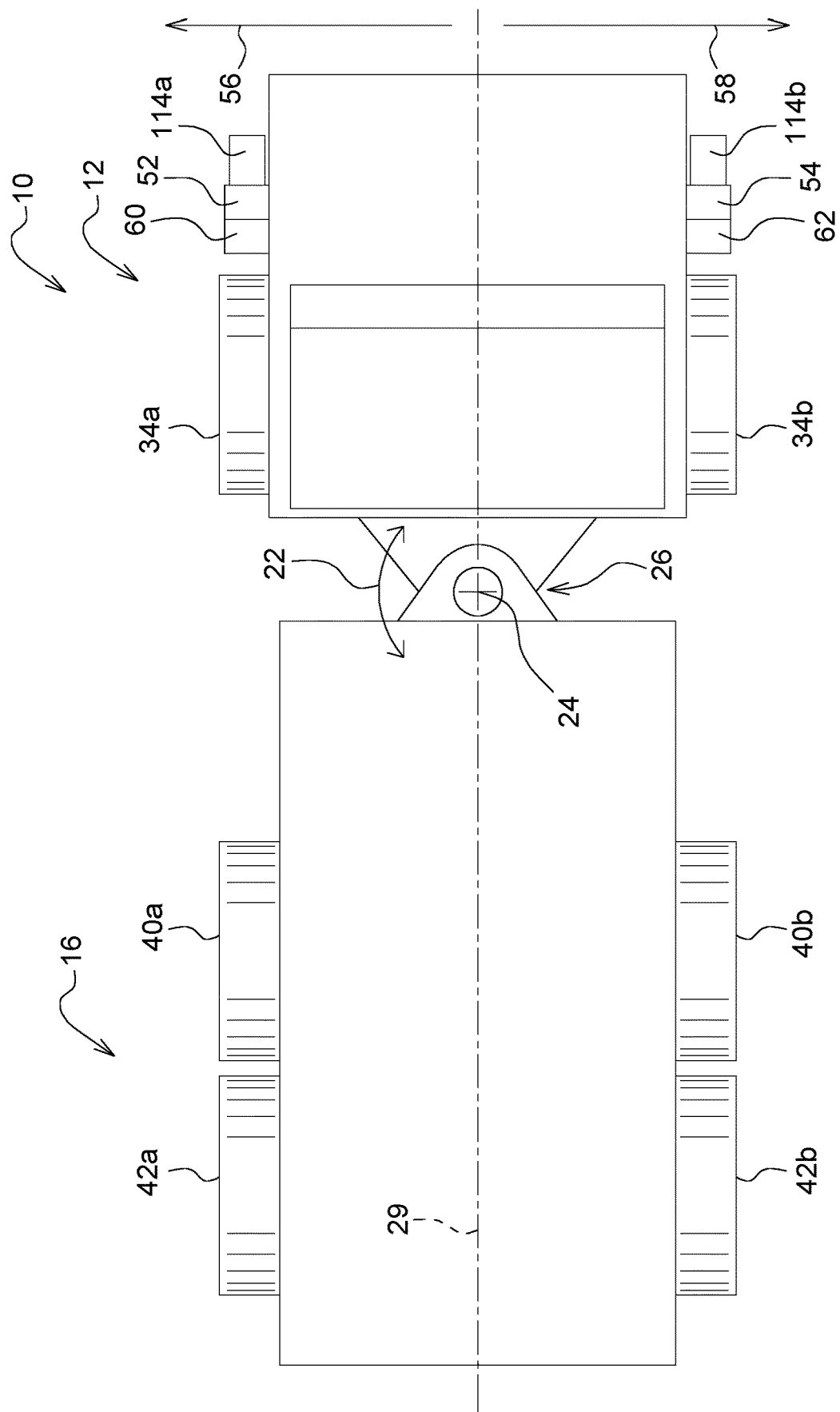
FIG. 2 is a top view of the embodiment shown in FIG. 1.

Referring initially to FIGS. 1 and 2, the work machine 10 with articulation is shown here as an articulated dump truck. However, the present disclosure is applicable to any work machine with an articulation point between two frames (e.g. forestry skidder and a motor grader). The work machine 10 comprises a fore portion 12 and a rear portion 16. The fore portion 12 includes a cab 30 and the rear portion 16 includes a trailer 18. The fore portion 12 is coupled to the rear portion 16 through a joint assembly 26. The joint assembly 26 includes a pivot frame coupling 22 and a rotational frame coupling (not shown). Pivot frame coupling 22 which provides for articulated movement, or turning, of the rear portion 16 relative to the fore portion 12 about a vertical axis 24. Rotational frame coupling (not shown) provides for rotational movement of the rear portion 16 relative to the fore portion 12 about a longitudinal axis 29. A front wheel assembly (34a, 34b) supports the fore portion 12, and a rear wheel assembly (40, 42) supports the rear portion 16. A bin 35 for containing a load is supported by the rear portion 16. An actuator 37, such as a hydraulic cylinder, may be coupled to the bin 35 for angularly elevating the bin relative to the rear portion 16 (as shown in phantom in FIG. 1). Left and right second or rear wheel assemblies are supported by the rear portion 16 and each illustratively includes a front wheel (40a, 40b) and a rear wheel assemblies (42a, 42b).

Figure 3:
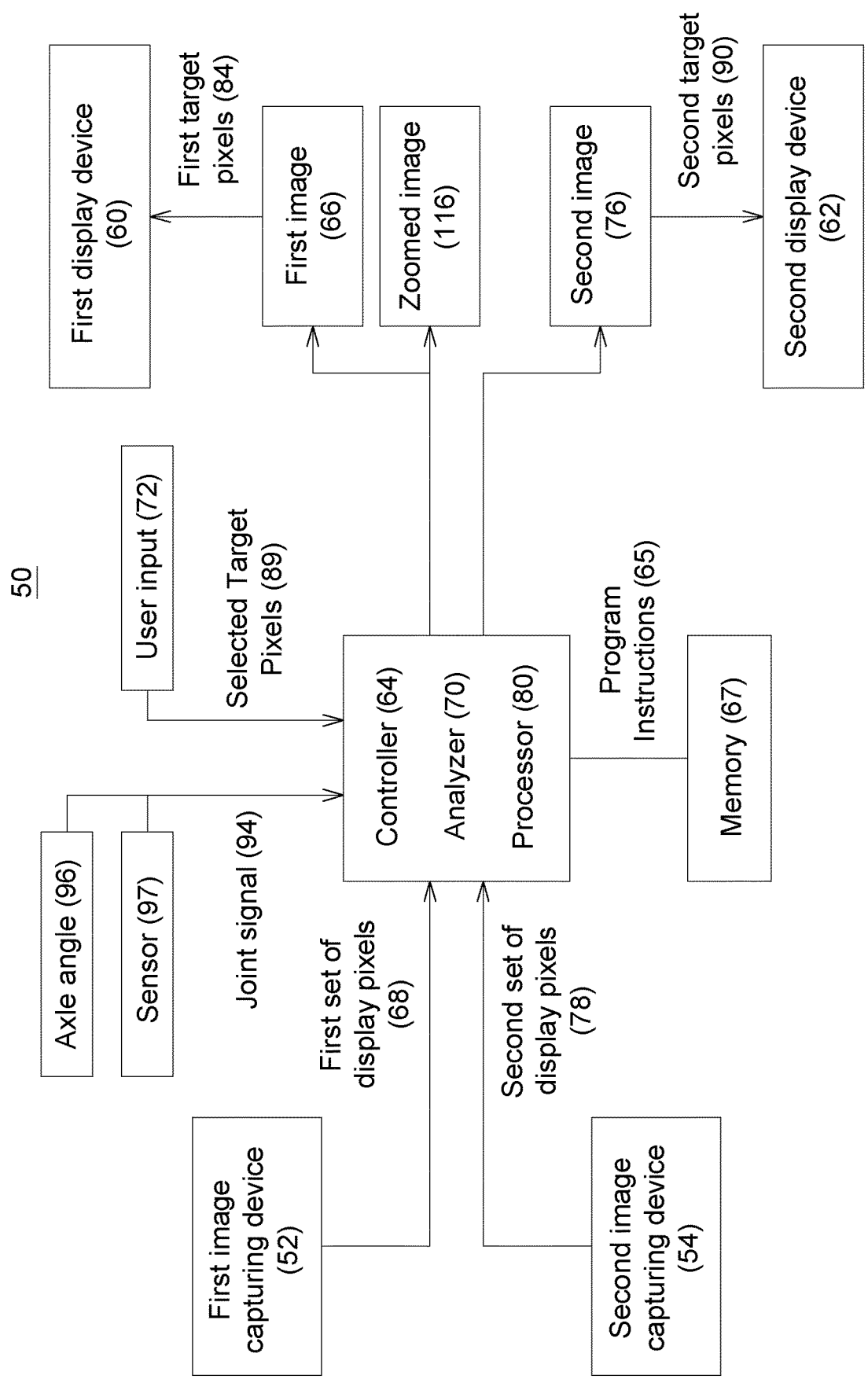
FIG. 3 is a block diagram of the system architecture of a display system for a work machine having an articulating joint.

Now turning to FIG. 3 with continued reference to FIGS. 1 and 2, the work machine 10 with an articulating joint assembly 26 has a digital panning system 50. The digital panning system 50 comprises of a first image capturing device 52 coupled to a left side 56 of the fore portion 12, a second image capturing device 54 coupled to a right side 58 of the fore portion 12, a first display device 60, a second display device 62 and a controller 64. The image capturing devices (52, 54) are fixedly coupled to the fore portion 12 of the work machine 10. The image capturing devices (52, 54) are rear-facing and may include one or more cameras mounted at elevated fixed mount positions, with such cameras remaining static to permit visual monitoring of an area. The field of view may encompass an area larger than what is displayed (e.g. a wide angle lens). The image capturing devices may provide a video feed to displays coupled to the cab 30, for an operator (through wire or wireless technology). Alternatively, an operator located remote from the work machine may receive the video feed wherein the signals are transferred over a network through a suitable wireless (e.g. WiFi or cellular) connection.

The first image capturing device 52 generates a first image 66 with a first set of display pixels 68, and the second image capturing device 54 generates a second image 76 with a second set of display pixels 78. The first and second set of display pixels (68,78) generate more pixels than are allocated on the display(s). The extra pixel information may be advantageously used for panning across the set of display pixels in response to the articulation of the work machine. The first display device 60 displays at least a portion of the first set of display pixels 68. The second display device 62 displays at least a portion of the second set of display pixels 78. The portions of the display pixels may represent a panning of the original set of display pixels, or alternatively, a user selected (i.e. through user input 72) zoomed in portion of the pixels in the area of interest. The first display device and the second display advantageously enable a synchronized improved viewing of each the left side 56 and the right side 58 of the work machine, as the work machine articulates. In one embodiment, the area of interest selected from the source set of pixels is not necessarily mapped one-to-one or magnified but rather scaled down, while still appearing to the user to pan across the area of interest. In another embodiment, the area of the target pixels remains static to a predetermined frame as the predetermined frame pans across the field of view of the first set of display pixels from the image capturing device (shown in FIG. 7B). This panning may occur in only the x-direction as the joint assembly rotates about the vertical axis, or additionally in the y-direction as the joint assembly tilts about the longitudinal axis. The primary advantage derived from the panning system stems from rotation about the vertical axis.

The controller 64 has a processor 80 with a digital mapping and filtering analyzer 70 communicatively coupling the first image capturing device 52 and the first display device 60, and communicatively coupling the second image capturing device 54 and the second display device 62. The processor 80 is configured to receive the first set of display pixels 68 and the second set of display pixels 78. The processor 80 then selectively digitally maps and filters a first target region 82 from the first set of display pixels 68 to display a first target pixels 84 on a first viewing frame 86 within the first display device 60. The processor 80 may also selectively digitally map and filter a second target region 88 from the second set of display pixels 78 to display a second target pixels 90 on a second viewing frame 92 within the second display device 62. The processor 80 selects the first target region 82 and the second target region 88 in response to the joint signal 94 received wherein the joint signal 94 is indicative of the articulation angle of the fore portion 12 relative to the rear portion 16 at or near the joint assembly 26. In a preferred embodiment, the first viewing frame 86 may encompass the entirety of the first display device 60. In alternative embodiment, the first viewing frame may be a subset of a plurality frames on the first display device 60. On a similar note, the second viewing frame may encompass the entirety of the second display device 62 or be subset of a plurality of frames on the second display device 62. In yet another embodiment, the first viewing frame and the second viewing frame may show the first target region and the second target, side-by-side, on a single display device. The first viewing frame 86 and the second viewing frame 92 may be rectangular.

The joint assembly 26 is an articulating joint assembly. The joint signal 94 may be based on one or more of an axle angle 96, a steering system feedback 98, a sensor 97 at the joint assembly 26, and a tracking of a reference point 98 from one of the first set of display pixels 68 and the second set of display pixels 78. Coupling the first target pixels and the second target pixels to the joint signal advantageously enables synchronized panning across the first set of display pixels and the second set of display pixels.

FIG. 4A demonstrates an exemplary view of the first display device 60 as located adjacent to the rear-facing mirror 114 coupled to the left side 56 of the fore portion 12 of the work machine 10. The second display device 62 is located adjacent to a rear-facing mirror 114 coupled to the right side 58 of the fore portion 12. Although the present embodiment may replace convex and/or concave mirrors currently used in industry, the present embodiment discloses the panning system used supplementary in conjunction with the mirrors. Furthermore, FIG. 4A discloses the first display device 60 coupled to an external surface of the cab 30. In another embodiment, the first display device 60 may be coupled to an internal surface of the cab 30 such as the control board, for example. FIG. 4B shows a typical view using a mirror 114 when the work machine is at articulation angle X (i.e. without the panning system). FIG. 4C shows the view on the first display device 60 when the work machine is at the same articulation angle X, but with the disclosed panning system.

Now turning to FIGS. 6, and 7a-7b, the panning range 100 of the first viewing frame 86 and the second viewing frame 92 may be calibrated by establishing a first pixel setpoint 102 when the joint assembly 26 articulation is near a minimum 104, establishing a second pixel setpoint 106 when the joint assembly 26 articulation is near maximum 108, and deriving a pixel per unit of articulation from the first pixel setpoint 102 and the second pixel setpoint 106. FIG. 7a demonstrates a first set of display pixels with an area of 1280 pixels×848 pixels in a first articulation angle shown as a near minimum articulation angle (i.e. straight or nearly straight in a fore-aft direction). The first viewing frame displays the first image of the first target region and is identified by the rectangular outline in bold. FIG. 7B demonstrates the first set of display pixels at a second articulation angle shown as a near maximum articulation angle. Here the first viewing frame (shown in bold) has panned across the first set of display pixels in response to the change in the articulation angle. The initial position of the viewing frame disclosed in FIG. 7A is shown in FIG. 7B in the dotted lines.

Furthermore, a user may selectively filter the first target pixels 84 within the first viewing frame 86 to zoom in on the first image 66, as shown in FIG. 8. In one embodiment, the first target pixels 84 may be outlined within a third viewing frame 112 that includes all of the first set of display pixels 68.

FIG. 5 provides an example arrangement of operations for a method 500 of displaying a first image 66 of a left side 56 of a work machine 10 and a second image 76 of right side 58 of a work machine 10 using the panning system 50. In a first step 510, the method 500 comprises generating the first image 66 with a first set of display pixels 68 by the first image capturing device 52 and generating a second image 76 with a second set of display pixels 78 by a second image capturing device 54. The first image capturing device 52, coupled to the fore portion 12 of the work machine 10, captures a rear-facing view of left-side environment of the rear portion 16 of the work machine 10. The second image capturing device 54, coupled to the fore portion 12 of the work machine 10, captures a rear-facing view of the right-side environment of the rear portion 16 of the work machine 10. In a next step 520, the method includes the processor 80 receiving the first set of display pixels 68 and the second set of display pixels 78; and receiving a joint signal 94 indicative of an articulation angle of a fore portion 12 of the work machine 10 relative to a rear portion 16 of the work machine 10 at the joint assembly 26. In step 530, the processor 80 then selectively digitally maps and filters a first target region 82 to create first target pixels 84 from the first set of display pixels 68 in response to the joint signal 94; and selectively digitally maps and filters a second target region 88 to create a second target pixels 90 from the second set of display pixels 78 in response to the joint signal 94. In step 540, the first target pixels 84 are displayed on a first viewing frame 86 within the first display devices 60, and the second target pixels 90 are displayed on a second viewing frame 92 within the second display device 62.

In order to reset or calibrate the panning range 100 of the first viewing range 86, the method 500 further comprises steps for calibrating 600 the panning system. FIG. 6 discloses an exemplary flow of steps for calibrating. In step 610, the work machine must be disable the park position. Steps 620 and 630 include the step of identifying a first pixel setpoint 102 from the first set of display pixels 68 when the joint articulation is near minimum. To achieve the near minimum articulation, the fore portion 12 and the rear portion 16 of the work machine 10 must be aligned substantially in a fore-aft direction. Once in position, the method 60 may include returning the work machine in the parked position. In steps 640 and 650, the processor on the controller 64 identifies a second pixel setpoint 106 from the first set of display pixels 68 when the joint assembly 26 articulation is near maximum. To achieve the near maximum articulation, the fore portion 12 and the rear portion 16 of the work machine must be substantially angled (at least 45 degrees) relative to one another. It may be contemplated that when the work machine needs to be moved to either near a minimum articulation or a maximum articulation during calibration, the work machine will preferably be placed in the unparked position and returned to park once the desired angle is achieved to ensure movement does not occur by engaging the brake. For example, the work machine may be placed in an unparked position in between steps 630 and 640 and return to the parked position before step 650. Calibration 600 of the panning range 100 must occur when the work machine 10 is stationary, and preferably in a parked position. In step 660, the processor 80 may calculate or derive a pixel per unit of articulation from the first pixel setpoint 102 and the second pixel setpoint 106.

The digital panning system 50 may further include zooming capabilities. That is, if an operator chooses to zoom in on a portion of an image (66, 68), the method 500 may include step 580 of manually selecting the first target pixels 84 within the first viewing frame 86 by a user, and step 590 displaying the manually selected target pixels 89 to display a zoomed image 116 in the first viewing frame 86.

As shown in the exemplary embodiment in FIGS. 7a and 7b, the first target region 82 may be identified by following a first reference point 98 in a first position 98a to a second position 98b, located on the rear portion 16 of the work machine 10. Similarly, the second target region 88 may be identified by following a second reference point located on the rear portion 16 of the work machine 10. Tracking of a reference point 98 may supplement or replace other means of deriving a joint signal 94.

FIG. 8 discloses a third viewing frame 112 that may be located within the first viewing frame 86, wherein the first set of display pixels 68 are shown. The first target pixels 84 are outlined with the rectangular bold frame indicating where, in the first set of display pixels 68, the first target pixels 84 are located. This third viewing frame 112 may assist during calibration 600 to assist in establishing the panning range 100. In another embodiment previously mentioned, the third viewing frame 112 may alternatively display zoomed in-on target pixels 84 as selected by a user 110.

As used herein, "e.g." is utilized to non-exhaustively list examples, and carries the same meaning as alternative illustrative phrases such as "including," "including, but not limited to," and "including without limitation."

As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C).

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The invention claimed is:

1. A digital panning system for a work machine with an articulating joint assembly, the digital panning system comprising:
   a fore portion of the work machine;
   a rear portion of the work machine coupled to the fore portion through the joint assembly;
   a first image capturing device mounted to an external surface on a left side of a cab of the fore portion, the first image capturing device rear-facing and having a field of view towards the rear portion, the first image capturing device generating a first image with a first set of display pixels;
   a second image capturing device mounted to an external surface on a right side of the cab of the fore portion, the second image capturing device rear-facing and having a field of view towards the rear portion, the second image capturing device generating a second image with a second set of display pixels;

a first display device for displaying at a least a portion of the first set of display pixels;

a second display device for displaying at least a portion of the second set of display pixels; and a controller having a processor with a digital mapping and filtering analyzer communicatively coupling the first image capturing device and the first display device, and communicatively coupling the second image capturing device and the second display device, wherein the processor is configured to:

receive the first set of display pixels;

receive the second set of display pixels;

selectively digitally map and filter a first target region from the first set of display pixels;

display a first target pixels on a first viewing frame within the first display device, and selectively digitally map and filter a second target region from the second set of display pixels;

display a second target pixels on a second viewing frame within the second display device;

wherein the first target region and the second target region are selected in response to a received joint signal, the first viewing frame panning across the first set of display pixels and the second viewing frame panning across the second set of display pixels in response to the joint signal, the joint signal indicative of a change in an articulation angle about a vertical axis of the fore portion relative to the rear portion at the joint assembly.

2. The digital panning system of claim 1, wherein the selective digital mapping and filtering of the first target region is based on a following of a first reference point located on the rear portion of the work machine, and the selective digital mapping and filtering of the second target region is based on following a second reference point located on the rear portion of the work machine.

3. The digital panning system of claim 1, wherein the joint signal is based on one of an axle angle, a steering system feedback, a sensor at the joint assembly, and a tracking of a reference point from one of the first set of display pixels and the second set of display pixels.

4. The digital panning system of claim 1, wherein the processor is further configured:

calibrate a panning range of one of the first viewing frame and the second viewing frame identifying a first pixel setpoint when the articulation angle is near a minimum, identifying a second pixel setpoint when the articulation angle is near maximum, and derive a pixel per unit of articulation value to dynamically adjust the first viewing frame and the second viewing frame in real-time in response to the joint signal.

5. The digital panning system of claim 1, wherein a user may select a zoom area of the first target pixels within the first viewing frame to display the zoom area on the first display device.

6. The digital panning system of claim 1 wherein the first viewing frame and the second viewing frame are rectangular.

7. The digital panning system of claim 1, wherein the first viewing frame of the first target pixels are outlined within a third viewing frame that includes all of the first set of display pixels.

8. The digital panning system of claim 1, wherein the first display device is located adjacent to a rear-facing mirror coupled to the left side of the fore portion.

9. A method of panning a first image of a left side of a work machine with articulation and a second image of a right side of the work machine, the method comprising:

generating the first image with a first set of display pixels by a first image capturing device mounted to an external surface on the left side of a cab of a fore portion of the work machine, the first image capturing device rear-facing and having field of view towards a rear portion of the work machine, the fore portion and the rear portion connected through an articulating joint assembly;

generating the second image with a second set of display pixels by a second image capturing device mounted to an external surface on the right side of the cab, the second image capturing device rear-facing and having a field of view towards the rear portion;

receiving the first set of display pixels and the second set of display pixels by a processor;

receiving a joint signal by the processor indicative of an articulation angle about a vertical axis at the joint assembly of the fore portion of the work machine relative to the rear portion of the work machine;

selectively digitally mapping and filtering a first target region to create a first target pixels from the first set of display pixels in response to the joint signal;

selectively digitally mapping and filtering a second target region to create a second target pixels from the second set of display pixels in response to the joint signal;

displaying the first target pixels on a first viewing frame within a first display device, and displaying the second target pixels on a second viewing frame within a second display device wherein the first viewing frame pans across the first set of display pixels and the second viewing frame pans across the second set of display pixels in response to the joint signal, a joint signal indicating-a change in the articulation angle at the joint assembly.

10. The method according to claim 9, wherein the selective digital mapping and filtering of the first target region is based on a following of a first reference point from the first set of display pixels, and the second target region is further selected from following a second reference point from the second set of display pixels.

11. The method according to claim 9, wherein the joint signal is based on an axle angle, a steering system feedback, a sensor at the joint assembly, and a tracking of a reference point from one of the first set of display pixels and the second set of display pixels.

12. The method according to claim 9 further comprises:

calibrating a panning range of the first viewing frame wherein calibrating the panning range includes identifying a first pixel setpoint from the first set of display pixels when the articulation angle is near a minimum, identifying a second pixel setpoint from the first set of display pixels when the articulation angle is near maximum, and deriving a pixel per unit of articulation value to dynamically adjust the first viewing frame and the second viewing frame in real-time in response to the joint signal.

13. The method according to claim 9 further comprising:

manually selecting a zoom area of the first target pixels within the first viewing frame by a user, and displaying the zoom area for display on the first display device.

14. The method according to claim 9 wherein the first viewing frame and the second viewing frame are rectangular.

15. The method according to claim 9, wherein the first viewing frame of the first target pixels are outlined within a third viewing frame that includes all of the first set of display pixels.

16. The method of claim 9, wherein the first display device is located adjacent to a rear-facing mirror coupled to the left side of the fore portion.

17. The method of claim 12, wherein identifying a pixel setpoint occurs when the work machine is in a parked position.

18. A digital panning system for a work machine with an articulating joint assembly, the digital panning system comprising:
a fore portion of the work machine;
a rear portion of the work machine coupled to the fore portion through the joint assembly;
a first image capturing device mounted to an external surface on a left side of a cab of the fore portion, the first image capturing device rear-facing and having a field of view towards the rear portion, the first image capturing device generating a first image with a first set of display pixels;
a second image capturing device mounted to an external surface on a right side of the cab of the fore portion, the second image capturing device rear-facing and having a field of view towards the rear portion, the second image capturing device generating a second image with a second set of display pixels;
a first display device for displaying at a least a portion of the first set of display pixels;
a second display device for displaying at least a portion of the second set of display pixels; and
a controller having a processor with a digital mapping and filtering analyzer communicatively coupling the first image capturing device and the first display device, and communicatively coupling the second image capturing device and the second display device, wherein the processor is configured to:
receive the first set of display pixels;
receive the second set of display pixels;
selectively digitally map and filter a first target region from the first set of display pixels;
display a first target pixels on a first viewing frame within the first display device, and
selectively digitally map and filter a second target region from the second set of display pixels;
display a second target pixels on a second viewing frame within the second display device;
wherein the first target region and the second target region are selected in response to a received joint signal, the first viewing frame panning across the first set of display pixels within a panning range and the second viewing frame panning across the second set of display pixels within the panning range in response to the joint signal, the joint signal indicative of a change in an articulation angle about a vertical axis of the fore portion relative to the rear portion at the joint assembly; and
calibrating the panning range of the first viewing frame wherein calibrating the panning range includes
identifying a first pixel setpoint from the first set of display pixels when the articulation angle is near a minimum,
identifying a second pixel setpoint from the first set of display pixels when the articulation angle is near maximum, and
deriving a pixel per unit of articulation value to dynamically adjust the first viewing frame and the second viewing frame in real-time in response to the joint signal.

19. The digital panning system of claim 18, wherein the first viewing frame panning across the first set of display pixels and the second viewing frame panning across the second set of display pixels occur in synchrony as the work machine articulates.

* * * * *